March 19, 1935.  W. DE BACK  1,994,756

GRADING APPARATUS

Filed Jan. 4, 1932  4 Sheets-Sheet 1

INVENTOR.
William de Back.
BY
ATTORNEY.

March 19, 1935.  W. DE BACK  1,994,756
GRADING APPARATUS
Filed Jan. 4, 1932  4 Sheets-Sheet 3
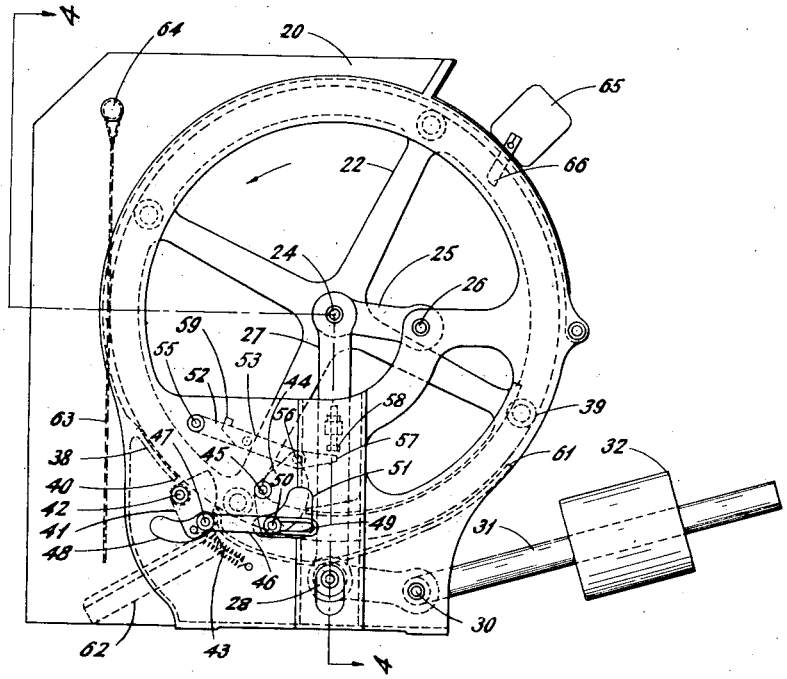
Fig_6.
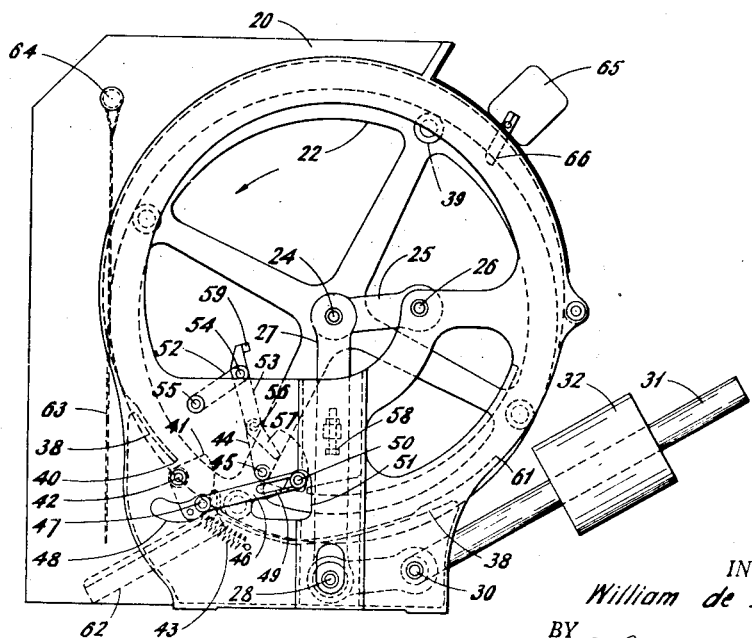
Fig_7.
INVENTOR.
William de Back.
BY
ATTORNEY.

March 19, 1935.  W. DE BACK  1,994,756
GRADING APPARATUS
Filed Jan. 4, 1932  4 Sheets-Sheet 4

INVENTOR.
William de Back.
BY
ATTORNEY.

Patented Mar. 19, 1935

1,994,756

UNITED STATES PATENT OFFICE 1,994,756

GRADING APPARATUS

William de Back, San Jose, Calif., assignor to Food Machinery Corporation, San Jose, Calif., a corporation of Delaware Application January 4, 1932, Serial No. 584,707

11 Claims. (Cl. 249—19)

This invention relates to the art of handling articles in bulk, such as fruit or the like, and has particular reference to an improved form of sorting device for sorting fruit into measured groups of uniform sizes, and a novel form of weighing and transferring apparatus forming a portion of such sorting device.

As is well known the fruit grower ordinarily does not pack his own fruit, but takes it to a convenient packing house for this purpose, where it is graded for quality and sorted into groups according to size preparatory to packing into boxes, crates, or other containers for shipment to the market. After the fruit has thus been graded and sorted the grower is credited with, or receives payment for it, according to the quantity of each size and grade which he has brought in.

During the height of the packing season it is not uncommon for a number of growers to deliver their fruit to the packing house at the same time, and as each successive lot of fruit is run through the sizing machine it must be measured before being mixed with fruit previously sized, thus making it necessary either to clear the sizing machine of all fruit before another lot is run through it or to estimate the residual amount of fruit remaining from the previous lot.

Neither of these two procedures is very satisfactory, for the reason that the clearing of a machine requires more or less time, during which the machine is necessarily idle and those growers whose fruit has not yet been sized are forced to wait, thus wasting a large amount of time on the part of the growers, and limiting the capacity of the packing house. On the other hand, where the expedient of estimating the amounts of residual fruit is resorted to, a certain amount of dissatisfaction usually results on the part of growers who are oftentimes skeptical as to whether or not the amount of their fruit was correctly estimated.

It is with the solution of this problem that the present invention is concerned, and its general object is to provide a fruit sizing machine incorporating means for continuously measuring the quantity of each size of fruit passing therethrough, so that there may be no need for estimating, and the machine can be run continuously on successive lots of fruit, the amount of each of which is correctly indicated.

It is also an object to provide a novel weighing and transfer device suitable for use with fruit sizing machines and which shall be simple, rugged in construction and accurate and efficient in operation.

With these objects in view, as well as others which will become more apparent as the description progresses, the invention consists in the novel construction and combination of parts hereinafter described and illustrated in the accompanying drawings, in which:

Figure 6 is an end elevation of the apparatus shown in Figure 4 as viewed from the right, and illustrates the positions of the parts before loading.

Figure 7 is a view similar to Figure 6, but showing the positions of the parts just after the hopper has received its full load and has begun to transfer it.

Figure 1:
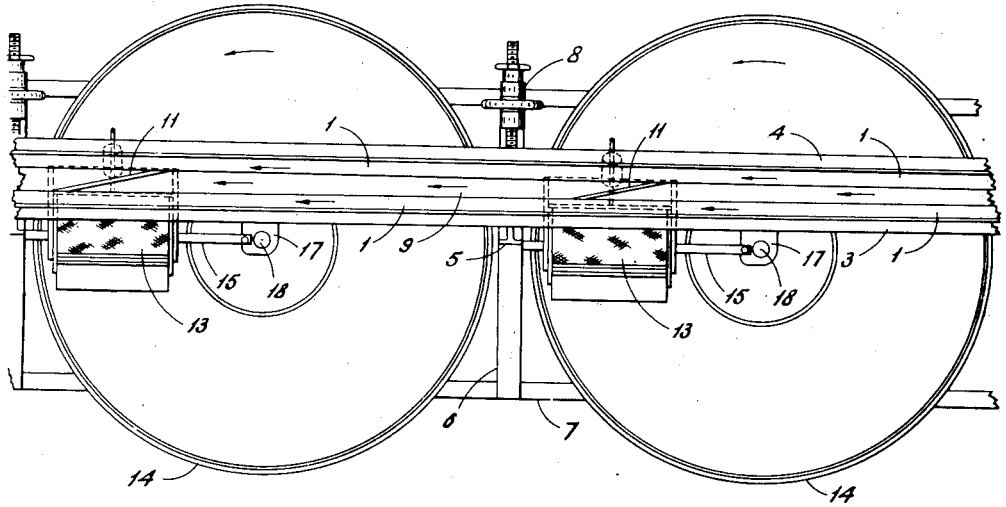
Figure 1 is a plan view of a portion of a fruit sizing machine constructed according to the invention.
Figure 2:
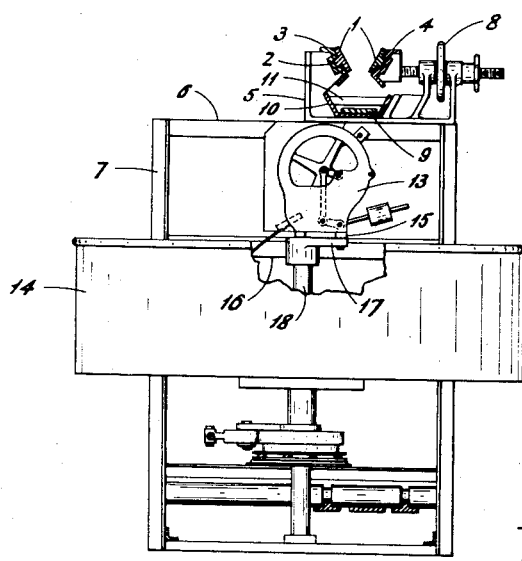
Figure 2 is an end elevation of the apparatus shown in Figure 1, looking from the right.
Figure 3:
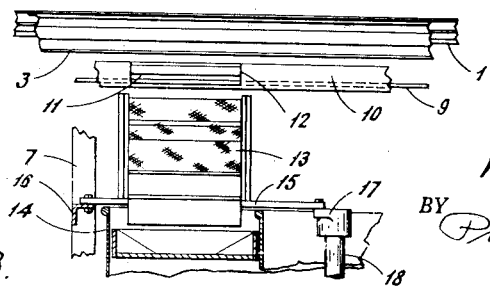
Figure 3 is a fragmentary side elevation, partly in section, of a portion of the apparatus illustrated in Figure 1.
Figure 4:
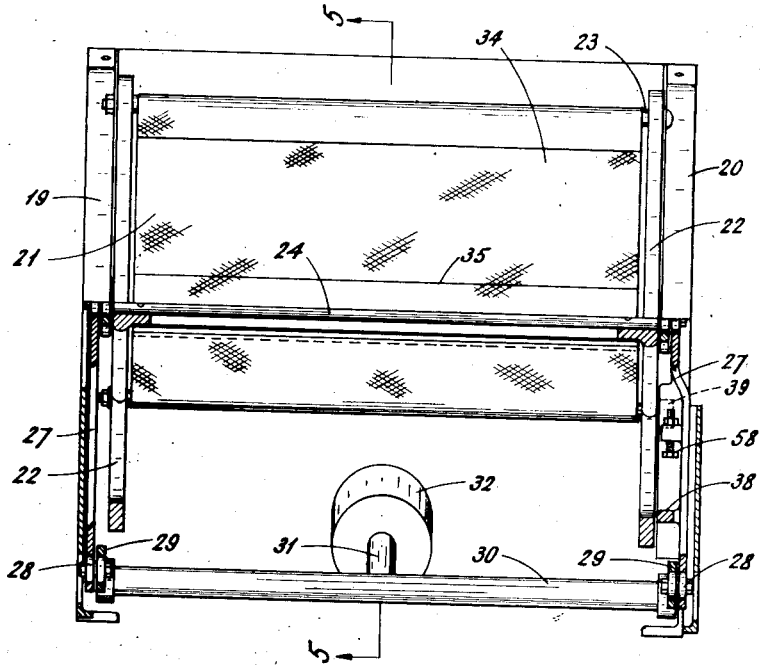
Figure 4 is a side elevation, partly in section, drawn to an enlarged scale of the automatic weighing and transfer device as seen along the line 4—4 of Figure 6.
Figure 5:
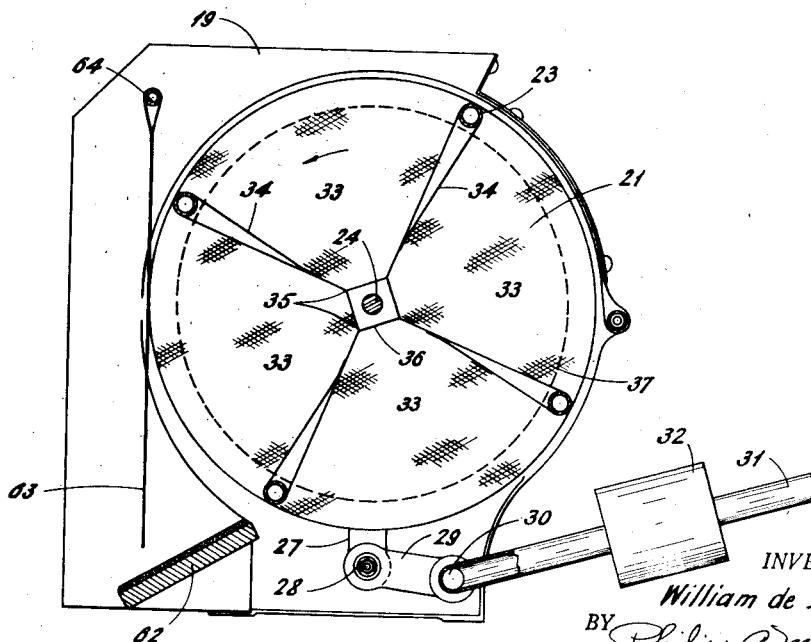
Figure 5 is a sectional view taken along the line 5—5 of Figure 4.
Figure 8:
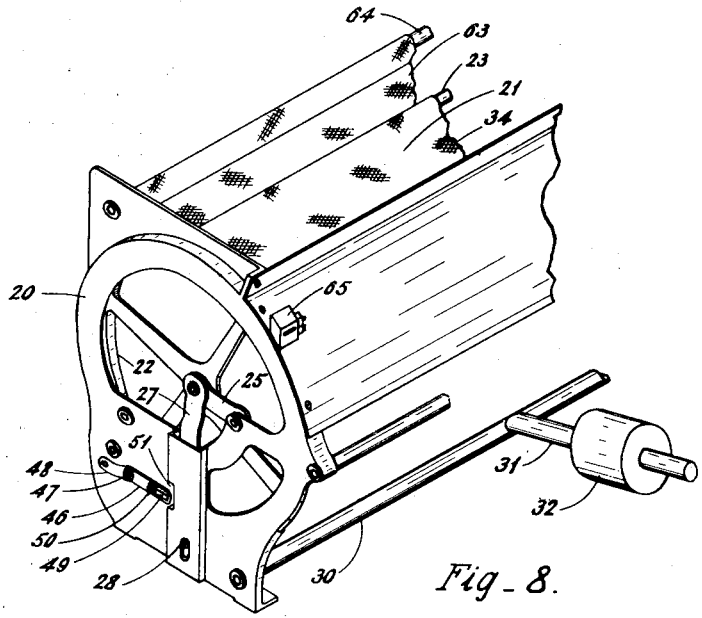
Figure 8 is an isometric illustration of that end of the weighing apparatus illustrated in Figures 6 and 7.
Figure 9:
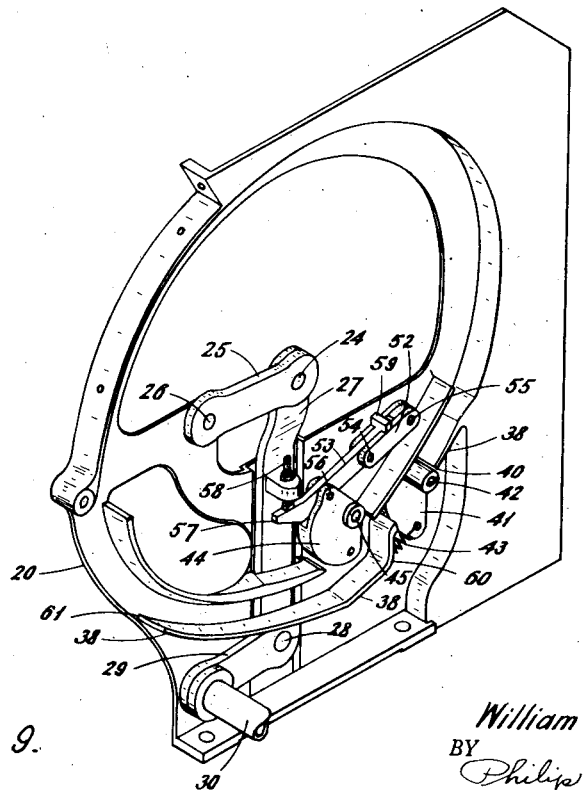
Figure 9 is an isometric view of the inner face of the end frame shown in Figures 6, 7 and 8.

Referring to Figures 1 to 3 inclusive, I have illustrated only so much of a fruit sizing apparatus as is necessary to an understanding of the present invention and including a pair of longitudinally divergent endless moving belts 1 having their faces angularly disposed so as to form open bottomed troughs, as best illustrated in Figure 2. These belts are provided with longitudinal beads 2 on their rear faces which cooperate with complementary longitudinal slots formed in guides 3 and 4 which support and guide the belts. The guides 3 and 4 are supported by brackets 5 secured at intervals to cross members 6 of the frame 7, the inner guide 3 being stationary and fixed to the brackets while the outer guide 4 is supported by adjustable mountings 8 on each bracket whereby it can be moved relative to the inner guide to vary the distance between them. As will be understood by those familiar with fruit sizer construction, the outer guides are set in such position that the belts 1 diverge from one end of the machine to the other so that pieces of fruit deposited between the belts 1 will be carried along thereby until the belts have diverged sufficiently to release it.

An endless carrier belt 9 is arranged below the sizing belts 1 to operate in the bottom of a longitudinal trough 10 supported by the brackets 5 and serves to receive the pieces of fruit as they are released from the sizing belts and carry them along until they are swept therefrom by the diverting strips 11 angularly arranged above the belt 9 adjacent discharge openings 12 in the outer wall of the trough 10.

The fruit discharged from each discharge opening 12 is received by an automatic weighing and transfer device indicated generally at 13, which transfers the fruit in quantities of uniform weight to a rotary bin 14 from which it is removed as desired by attendants for packing. The bins 14 may be slowly rotated in the direction indicated by the arrows by any suitable means, which is not shown as such means forms no part of the present invention.

In the apparatus illustrated, only two packing bins 14 are shown, but it will be understood that in practice any number of these bins may be utilized, depending upon the number of sizes into which the fruit is to be separated.

An automatic weighing and transfer device is provided for each packing bin and one is supported below and adjacent each of the discharge openings 12 by bars 15 whose ends rest upon cross members 16 of the frame 7 and brackets 17 secured to extensions of the vertical bin supporting shafts 18.

Each weighing device 13, as best shown in Figures 4 to 9, includes spaced end frames 19 and 20 between which is mounted a rotatable pocket hopper 21 comprising a pair of wheels 22 secured together in spaced relation by a plurality of spacer rods 23 and a central shaft 24. Each outer end of the shaft 24 passes through the end of a horizontally disposed link 25 pivoted to the end frame at 26 and the upper end of a vertically disposed link 27 so as to form a pivotal connection for the links. The lower ends of the vertical links 27 are pivoted at 28 to links 29 secured at their opposite ends to a rod 30 rotatably journalled at its ends in the frame members 19 and 20. A scale beam 31 is attached to the rod 30 midway of its length and is provided with an adjustable poise 32.

By the construction just described it will be seen that the hopper 21 is normally supported in elevated position by the weighted scale beam, but may be depressed upon the addition of material to the hopper.

The hopper itself is made up of a plurality of pockets or compartments 33 formed by intervening walls 34 of fabric or other resilient material folded around the spacer rods 23 and sewed in place. The inner portions of the fabric walls are sewed together at 35 so as to draw the fabric taut and form a rectangular shaped sleeve 36 surrounding the hopper shaft 24 and spaced therefrom. This insures that pieces of fruit falling into the hopper from above will not strike against the shaft 24 and so be damaged, while the resilient walls further serve to promote gentle treatment. Preferably the end walls of the hopper are also covered with resilient fabric 37.

The end frame 20 is provided on its inner face with an interrupted track 38, which serves as a guide for the rollers 39, provided on the outer ends of the spacer rods 23, during the lower portion of their travel upon rotation of the hopper in the direction indicated by the arrows. The track is interrupted at 40 to provide a gap in which operates a latch sector 41 pivoted to the inside of the frame member 20 at 42 and normally held in raised position by a spring 43. A stop sector 44 is pivoted to the inside of the frame at 45 and the sectors are interconnected by a link 46 disposed on the outer side of the frame and pivoted at one end to a pin 47 secured to the sector 41 and projecting through an arcuate slot 48 in the frame. The opposite end of the link 46 is provided with a slot 49 in engagement with a pin 50 secured to the sector 44 and projecting through an opening 51 in the frame.

A pair of toggle links 52 and 53, pivoted together at 54, are arranged adjacent the inner face of the frame 20, the links 52 being pivotally pinned to the frame at 55 and the links 53 being pivotally pinned to the stop sector 44 at 56. The link 53 is provided with an extension 57 which projects into the path of an adjustable stud 58 carried by the inner side of the vertical link 27 when the toggle links are aligned. A lug 59 carried by the link 53 is adapted to engage the upper edge of the link 52 to prevent the toggle links from doubling downward.

The track 38 is downwardly stepped at 60 and extends to a point indicated at 61 and is so curved that when the hopper is rotated after being depressed, the roller 39 travelling along the track is urged inwardly to assist the weight 32 in returning the hopper to its normally elevated position. This construction has been found necessary for the reason that under high speed operating conditions the weight 32 does not always return the hopper quickly enough so that the track provides an additional positive means for insuring the proper return of the hopper to its elevated position under all conditions.

In Figure 6 the parts are shown in the positions they occupy before any material is deposited in the hopper. The hopper is held in elevated position by the weight 32 and is held against rotation by reason of the engagement of a roller 39 with the forward edge of the stop sector 44. The toggle links 52 and 53 are in alignment so that the stop sector 44 is held firmly in place to preclude accidental displacement thereof by the roller 39 by any sudden jar or vibration.

In the position of the parts shown in Figure 6 it will be noted that the hopper is so held that the forward wall of the upper compartment is disposed at a lesser angle to the horizontal than the rear wall thereof, whereby the major portion of the weight of articles deposited in the compartment is borne by the forward wall. As articles accumulate in the compartment, therefore, the overbalanced condition would cause rotation of the hopper were it not prevented by reason of the engagement of the roller 39 with the stop sector 44.

As articles accumulate in the upper compartment the hopper is depressed in proportion to their weight, so that when a predetermined weight is reached the stud 58 carried by the supporting link 27 engages with the extension 57 on the toggle link 53 and breaks the toggle joint so as to lift the stop sector 44 out of the path of the roller 39. The force exerted against the stop sector by the roller 39 due to the overbalanced condition of the hopper also assists in displacing the stop sector, which assumes the position shown in Figure 7, whereupon the hopper is free to rotate, and does so. By reason of the slot 49 in the connecting link 46 the displacement of the sector 44 does not affect the position of the sector 41 which is held in position by the spring 43.

Upon rotation of the hopper the upper compartment is lowered sufficiently to spill its contents out over the padded ramp 62 into the packing bin, a fabric curtain 63 hung from a tie rod 64 serving to prevent forward projecting of articles from the hopper and insuring gentle delivery thereof. As the hopper is relieved of its load and continues to rotate, the weight 32 raises it back to elevated position and the timely return to this position is assured by the curvature of the cam track 38 which engages the roller 39 after it has passed the stop sector, as well as with the succeeding roller approaching the latch sector 41 and urges them upwardly to lift the hopper.

By this time the hopper is rotating rapidly and the succeeding roller comes into engagement with the latch sector 41 with considerable force and displaces it against the tension of the spring 43. This absorbs most of the shock of stopping the hopper and simultaneously the stop sector 44 is returned into the path of the roller by reason of the link 46 which connects the two sectors. The roller thereupon strikes against the stop sector, which is again held firmly in place by the return of the toggle link into alignment, and further rotation of the hopper is prevented. The parts are now again in the position shown in Figure 6, ready for a repetition of the cycle of operations just described.

A counting mechanism 65, of any well known construction, is secured to the end frame 20 and is provided with an arm 66 which projects inwardly into the path of the rollers 39. Each time a roller engages with and passes the arm 66 the counting mechanism is actuated so that the number of discharges is indicated.

In the operation of the sizing mechanism as a whole, the pieces of fruit to be sized are deposited upon and between the sizing belts 1 and each piece is carried along thereby in the direction of the arrows until the belts have diverged sufficiently to release it. Whereupon it drops between the sizing belts onto the carrier belt therebeneath. The fruit is then carried by the carrier belt until it reaches the next diverting piece 11, whereupon it is swept from the belt through the discharge opening 12 and falls into the upper compartment of the hopper 21. When the hopper has received a predetermined weight of fruit it automatically operates to transfer the same to the slowly rotating packing bin 14, from which an attendant may remove it in accordance with packing requirements.

It will now be apparent that successive lots of fruit may be run through the fruit sizing apparatus herein disclosed while simultaneously the quantity of each size is automatically measured and indicated. By comparing the readings on the counting devices before and after each lot of fruit is run through the machine, its quantity may be exactly determined without the necessity of resorting to any guesswork, and practically no delay is occasioned between successive lots of fruit.

It will be understood, of course, that while the apparatus has been described as being applicable to the sizing and automatic weighing of fruit, its field of usefulness is not limited thereto, but may embrace other articles as well, the scope of the claims hereto appended being intended to include all such uses.

Having now described my invention, and in what manner the same may be used, what I claim as new and desire to protect by Letters Patent is:

1. In an automatic weighing machine, the combination of a revoluble pocketed hopper, a depressible support therefor, a laterally projecting stud carried by the hopper, a movable stop member disposable in the path of travel of said stud, means for moving said stop member out of the path of travel of the stud when the hopper is depressed a predetermined amount whereby the hopper is free to rotate, and means operable by engagement with said stud upon rotation of the hopper for returning the stop member into the path of the stud.

2. In an automatic weighing machine, the combination of a revoluble pocketed hopper, a depressible support therefor, a laterally projecting stud carried by the hopper, a movable stop member disposable in the path of travel of said stud, means for moving said stop member out of the path of travel of the stud when the hopper is depressed a predetermined amount whereby the hopper is free to rotate, a displaceable latch member disposed forwardly of said stop member in the path of said stud and adapted to cooperate with the stud to prevent reverse rotation of the hopper, and means interconnecting said latch member and stop member to cause the latter to be projected into the path of the stud when said stud displaces the latch member.

3. In an automatic weighing machine, the combination of a revoluble pocketed hopper, a laterally projecting stud carried by the hopper, a movable stop member disposable in the path of travel of said stud, a displaceable latch member disposed forwardly of said stop member in the path of said stud and adapted to cooperate with the stud to prevent reverse rotation of the hopper, and a lost motion connection between said latch and stop member whereby the latter may be moved out of the path of the stud without affecting the position of the latch member, while displacement of the latch member by the stud operates to return the stop member into the path of said stud.

4. In an automatic weighing machine, the combination of a revoluble pocketed hopper, a laterally projecting stud carried by the hopper, a movable stop member disposable in the path of travel of said stud, a displaceable latch member disposed forwardly of said stop member in the path of said stud and adapted to cooperate with the stud to prevent reverse rotation of the hopper, a link interconnecting said latch and stop members, said link being pivotally secured to one of said members and being provided with a slot, means associated with the other of said members engageable with the slot whereby the stop member may be moved out of the path of the stud without affecting the position of the latch member, while displacement of the latch member by the stud operates to return the stop member into the path of said stud.

5. In an automatic weighing machine, the combination of a revoluble pocketed hopper, a depressible support therefor, a laterally projecting stud carried by the hopper, a movable stop member, means for holding said stop member in the path of said stud including a pair of toggle jointed links, means for breaking the toggle joint when the hopper is depressed a predetermined amount to move the stop member out of the path of the stud whereby the hopper is free to rotate, and means disposed forwardly of the stop member and operable by engagement with the stud to return the stop member into the path of the stud whereby the toggle links are realigned so as to hold the stop member in place.

6. In an automatic weighing machine, the combination of a revoluble pocketed hopper, a depressible support therefor, a laterally projecting stud carried by the hopper, a movable stop member, means connected with said stop member for holding it in the path of said stud including a pair of toggle jointed links, means for breaking the toggle joint when the hopper is depressed a predetermined amount to move the stop member out of the path of the stud whereby the hopper is free to rotate, a latch member yieldably held in the path of said stud forwardly of said stop member and adapted to cooperate with the stud to prevent reverse rotation of the hopper, and means interconnecting said latch member and stop member to cause the latter to be projected into the path of the stud when said stud engages the latch member and the toggle links are realigned so as to hold the stop member in place.

7. In an automatic weighing machine, the combination of a revoluble pocketed hopper, a depressible support therefor, a laterally projecting stud carried by the hopper, a movable stop member, means connected with said stop member for holding it in the path of said stud including a pair of toggle jointed links, means for breaking the toggle joint when the hopper is depressed a predetermined amount to move the stop member out of the path of the stud whereby the hopper is free to rotate, a latch member yieldably held in the path of said stud forwardly of said stop member and adapted to cooperate with the stud to prevent reverse rotation of the hopper, and a lost motion connection between said latch and stop member whereby movement of the latter does not affect the position of the latch member, although displacement of the latch member by the stud operates to project the stop member into the path of the stud whereby the toggle links are realigned so as to hold the stop member in place.

8. In an automatic weighing machine, a revoluble pocketed hopper, a depressible support therefor, a laterally projecting stud carried by the hopper, a cam track for guiding the stud, said cam track being of curvilinear conformation except for an outwardly offset portion in its lower periphery, and a stop member disposable in the path of travel of the stud and so located adjacent the track offset that the stud is held over the offset portion of the track when in engagement with the stop member whereby the hopper may be depressed.

9. In an automatic weighing machine, a revoluble pocketed hopper, a depressible support therefor, a laterally projecting stud carried by the hopper, a cam track for guiding the stud, said cam track being of curvilinear conformation except for an outwardly offset portion in its lower periphery, a stop member disposable in the path of travel of the stud and so located adjacent the track offset that the stud is held over the offset portion of the track when in engagement with the stop member whereby the hopper may be depressed, and means for moving said stop member out of the path of travel of the stud when the hopper is depressed a predetermined amount whereby the hopper is free to rotate.

10. In an automatic weighing machine, a revoluble pocketed hopper, a depressible support therefor, a laterally projecting stud carried by the hopper, a cam track for guiding the stud, said cam track being of curvilinear conformation except for an outwardly offset portion in its lower periphery, a stop member disposable in the path of travel of the stud and so located adjacent the track offset that the stud is held over the offset portion of the track when in engagement with the stop member whereby the hopper may be depressed, means for moving said stop member out of the path of travel of the stud when the hopper is depressed a predetermined amount whereby the hopper is free to rotate, and means operable by engagement with said stud upon rotation of the hopper for returning the stop member into the path of the stud.

11. In an automatic weighing machine, a revoluble pocketed hopper, a depressible support therefor, a laterally projecting stud carried by the hopper, a cam track for guiding the stud, said cam track being of curvilinear conformation except for an outwardly offset portion in its lower periphery, a stop member disposable in the path of travel of the stud and so located adjacent the track offset that the stud is held over the offset portion of the track when in engagement with the stop member whereby the hopper may be depressed, a displaceable latch member disposed forwardly of said stop member in the path of said stud and adapted to cooperate with the stud to prevent reverse rotation of the hopper, and means interconnecting said latch member and stop member to cause the latter to be projected into the path of the stud when said stud displaces the latch member.

WILLIAM DE BACK.